United States Patent
Hill et al.

(10) Patent No.: US 9,312,672 B2
(45) Date of Patent: Apr. 12, 2016

(54) THREADED SLEEVE COMPRESSED SPLIT CABLE GLAND

(71) Applicant: Panduit Corp., Tinley Park, IL (US)

(72) Inventors: Raymond M. Hill, Plainfield, IL (US); Steven J. Sargis, Frankfort, IL (US)

(73) Assignee: Panduit Corp., Tinley Park, IL (US)

( * ) Notice: Subject to any disclaimer, the term of this patent is extended or adjusted under 35 U.S.C. 154(b) by 64 days.

(21) Appl. No.: 14/488,930

(22) Filed: Sep. 17, 2014

(65) Prior Publication Data

US 2015/0083486 A1  Mar. 26, 2015

Related U.S. Application Data

(60) Provisional application No. 61/882,722, filed on Sep. 26, 2013.

(51) Int. Cl.
| | |
|---|---|
| H02G 15/007 | (2006.01) |
| H02G 15/013 | (2006.01) |
| H02G 3/08 | (2006.01) |
| H02G 3/06 | (2006.01) |
| H02G 3/22 | (2006.01) |

(52) U.S. Cl.
CPC ............. *H02G 3/088* (2013.01); *H02G 3/0675* (2013.01); *H02G 3/083* (2013.01); *H02G 3/22* (2013.01)

(58) Field of Classification Search
CPC ... H02G 15/007; H02G 15/013; H02G 2/088; H02G 3/0675; H02G 3/083
USPC .......................................................... 174/653
See application file for complete search history.

(56) References Cited

U.S. PATENT DOCUMENTS

| | | | |
|---|---|---|---|
| 3,667,783 A | 6/1972 | Sotolongo | |
| 4,692,563 A | 9/1987 | Lackinger | |
| 4,842,364 A * | 6/1989 | Chen .................... | G02B 6/3807 |
| | | | 174/70 R |
| 4,891,470 A | 1/1990 | Studenski | |
| 5,051,541 A | 9/1991 | Bawa et al. | |
| 5,152,556 A | 10/1992 | Holland et al. | |
| 5,208,427 A | 5/1993 | Couto et al. | |
| 5,226,678 A | 7/1993 | Petranto | |
| 5,321,205 A | 6/1994 | Bawa et al. | |
| 5,543,582 A | 8/1996 | Stark et al. | |
| 5,594,202 A | 1/1997 | Tobias | |
| 5,621,191 A | 4/1997 | Norris et al. | |
| 5,648,639 A | 7/1997 | Hand | |

(Continued)

FOREIGN PATENT DOCUMENTS

| | | |
|---|---|---|
| DE | 2020004018347 U1 | 1/2005 |
| DE | 202009016166 U1 | 3/2010 |

(Continued)

*Primary Examiner* — Timothy Thompson
*Assistant Examiner* — Charles Pizzuto
(74) *Attorney, Agent, or Firm* — Christopher S. Clancy; Aimee E. McVady (57) ABSTRACT

The present invention is directed to a split cable gland with a first body member and a second body member. The first and second body members each have a main section and a threaded shaft extending from the main section. The inner surface of each main section has vertical slots. The split cable gland also includes gasket members with a plurality of outwardly extending ribs. The outwardly extending ribs are positioned within the vertical slots in the main sections. The first and second body members surround the cable extending through the opening in a cabinet to create a seal and strain relief arrangement around the cable.

15 Claims, 7 Drawing Sheets

(56) References Cited

U.S. PATENT DOCUMENTS

| | | | |
|---|---|---|---|
| 6,180,882 B1 | 1/2001 | Dinh | |
| 6,394,464 B1* | 5/2002 | Moreau | H02G 3/0675 |
| | | | 174/652 |
| 6,809,263 B2 | 10/2004 | Jackson | |
| 7,118,416 B2 | 10/2006 | Montena et al. | |
| 7,183,486 B2* | 2/2007 | Pyron | H01R 13/5219 |
| | | | 174/17.06 |
| 7,411,128 B2 | 8/2008 | Drotleff et al. | |
| 7,507,907 B2 | 3/2009 | Mueller et al. | |
| 7,544,901 B2 | 6/2009 | Ehmann | |
| 7,749,021 B2 | 7/2010 | Brodeur | |
| 7,781,685 B2 | 8/2010 | Bartholoma et al. | |
| 7,900,971 B2* | 3/2011 | Chiu | F16L 5/00 |
| | | | 174/655 |
| 8,134,088 B2 | 3/2012 | Naumann et al. | |
| 8,170,390 B2 | 5/2012 | Hand | |
| 8,367,944 B2 | 2/2013 | Chiou | |
| 8,440,919 B2 | 5/2013 | Robb et al. | |
| 2013/0323988 A1* | 12/2013 | Matoba | H01R 4/2433 |
| | | | 439/855 |

FOREIGN PATENT DOCUMENTS

| | | |
|---|---|---|
| EP | 0803953 B1 | 12/2000 |
| EP | 1072834 A1 | 1/2001 |
| EP | 0803954 B1 | 8/2001 |
| EP | 1022836 B1 | 10/2002 |
| EP | 0930687 B1 | 1/2007 |
| EP | 2492566 A2 | 8/2012 |
| JP | 2003066263 * | 3/2003 |
| JP | 5092062 B1 | 12/2012 |

* cited by examiner

THREADED SLEEVE COMPRESSED SPLIT CABLE GLAND

CROSS REFERENCE TO RELATED APPLICATION

This application claims priority to U.S. Provisional Application No. 61/882,722, filed Sep. 26, 2013, the subject matter of which is hereby incorporated by reference in its entirety.

FIELD OF THE INVENTION

The present invention relates to a cable gland, and more particularly to a sleeve compressed split cable gland for sealing and retaining a cable in a cabinet.

BACKGROUND OF THE INVENTION

Input and output modules on a machine require a connection to the master controller located in a switch or control cabinet. The cables from an input/output module are generally routed through an opening in panel walls of the cabinet. A cable gland is used to seal and retain the cables at the openings where the cable passes through the panel walls of the cabinet or other electrical equipment. The cable gland is equipped to meet the ingress protection rating necessary to match the NEMA rating of the equipment.

System integrators and OEM machine builders prefer to use pre-terminated cabling because installers do not need to field terminate the cable to the connector and pre-terminated cabling is already factory tested and certified. However, standard cable glands do not allow for pre-terminated cabling because the connector is too large to pass through the standard cable gland.

There are other types of cable glands available that incorporate a split-style, but these are either too difficult to make changes to, or they do not offer the necessary ingress protection rating required by the equipment or application. As a result, installers are forced to use field terminated cables resulting in increased installation time. The installers would also be required to field test or certify the connection which also increases installation time.

Thus, it would be desirable to provide an improved cable gland that seals and retains pre-terminated cables, as well as field terminated cables, in cabinets or other equipment.

SUMMARY OF THE INVENTION

A split cable gland that seals and retains a cable at an opening through a cabinet is disclosed. The split cable gland includes a first and second body member. The first and second body members each have a main section and a threaded shaft that extends from the main section. Each main section has vertical slots located in the inner surface. The split cable gland also includes gasket members that have a plurality of outwardly extending ribs. The outwardly extending ribs of the gasket members are positioned within the vertical slots in the main sections of the first and second body member. The first and second body members surround the cable extending through the opening in a cabinet to create a seal and strain relief arrangement around the cable.

DETAILED DESCRIPTION

Figure 1:
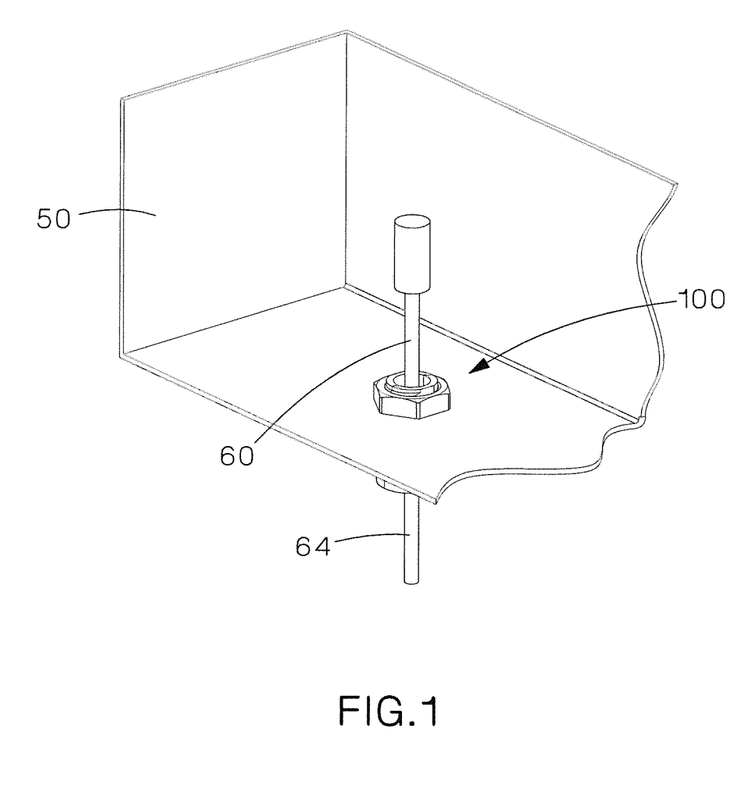
FIG. 1 is a perspective view of a split cable gland of the present invention installed in a switch cabinet.
Figure 2:
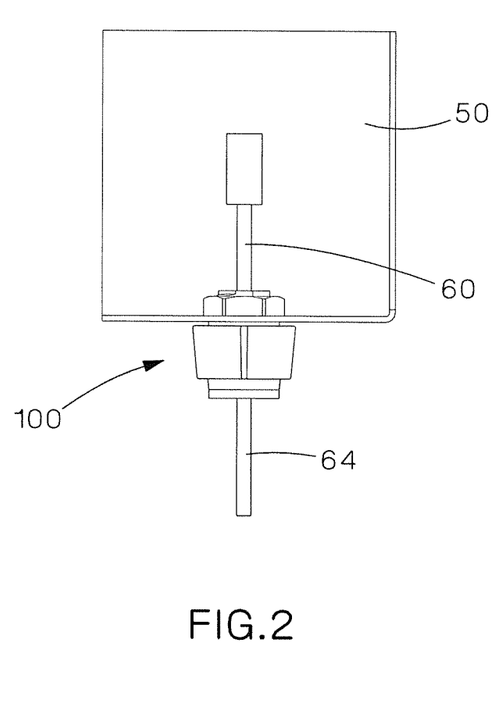
FIG. 2 is a side view of the split cable gland of FIG. 1.

FIGS. 1-4 illustrate a first embodiment of the split cable gland of the present invention. FIGS. 1 and 2 illustrate the fully assembled split cable gland 100 with a pre-terminated cable 60 housed therein. The split cable gland 100 is installed in the entry or opening 52 of a switch cabinet 50.

Figure 3:
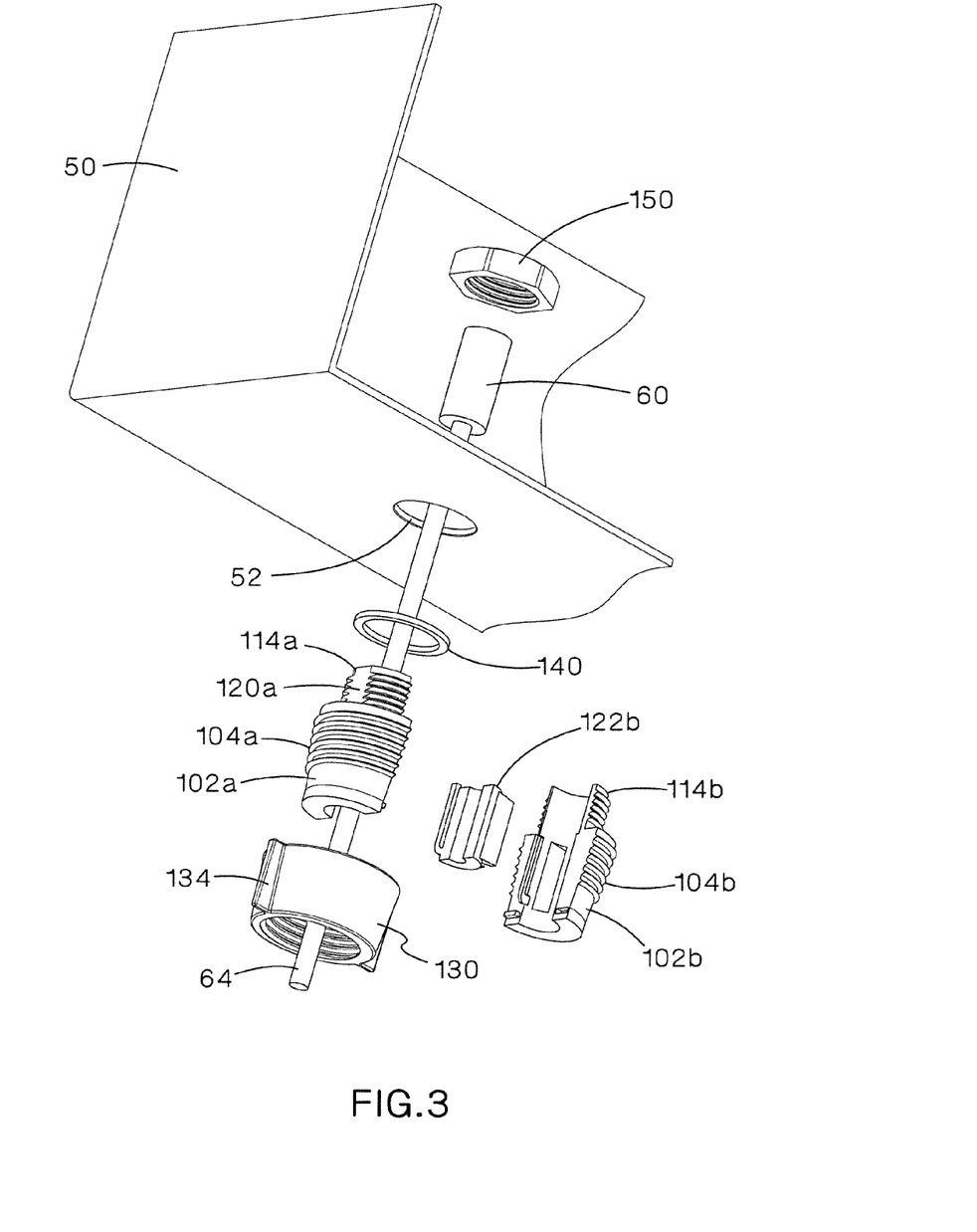
FIG. 3 is a bottom exploded view of the split cable gland of FIG. 1.
Figure 4:
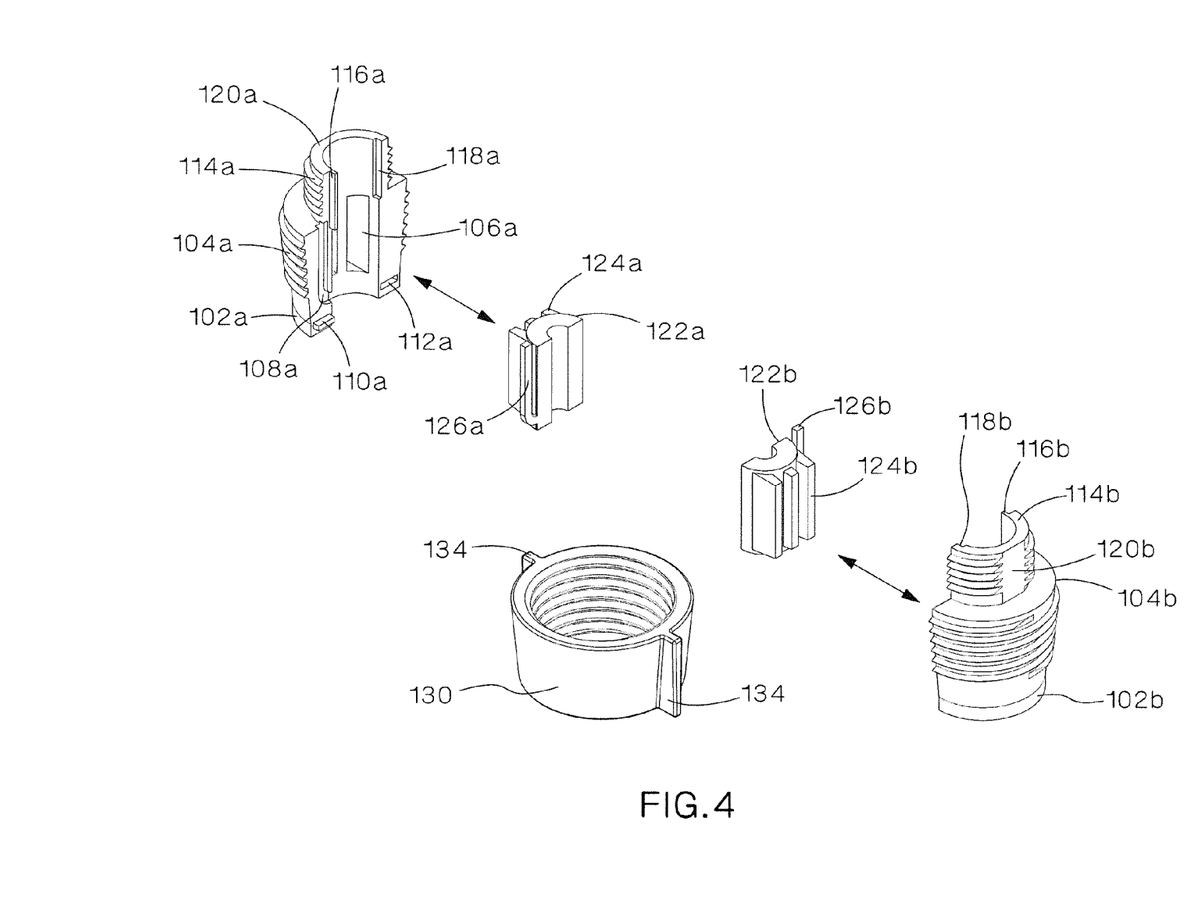
FIG. 4 is an exploded perspective view of the body and coupling of the split cable gland of FIG. 1.

FIG. 3 illustrates an exploded view of the split cable gland 100. The split cable gland 100 includes two body halves 102*a*, 102*b*. The cable gland body halves 102*a*, 102*b* come together as a unit to wrap around a cable 64. As illustrated in FIG. 4, each cable gland body half 102*a*, 102*b* includes a threaded main section 104*a*, 104*b* and a threaded shaft 114*a*, 114*b*. Slots 106*a*, 106*b* are located in the inner surface of the main section 104*a*, 104*b* of each cable gland body half 102*a*, 102*b*. Each main section 104*a*, 104*b* includes a groove 108*a*, 108*b* extending along the main surface in a direction similar to the slots 106*a*, 106*b*. Each main section 104*a*, 104*b* also includes a tongue 110*a*, 110*b* and groove 112*a*, 112*b* positioned at one end. Each threaded shaft 114*a*, 114*b* includes a tongue 116*a*, 116*b* and a groove 118*a*, 118*b* positioned along the threaded shaft 114*a*, 114*b*.

Each cable gland body half 102*a*, 102*b* includes a gasket 122*a*, 122*b*. Each gasket 122*a*, 122*b* includes a plurality of projected ribs 124*a*, 124*b* and a seal seam 126*a*, 126*b*. The projected ribs 124*a*, 124*b* of the gasket 122*a*, 122*b* are positioned in the slots 106*a*, 106*b* in the cable gland body halves 102*a*, 120*b*, respectively, to seat the gaskets 122*a*, 122*b* therein. The seal seams 126*a*, 126*b* of the gaskets 122*a*, 122*b* are positioned within grooves 108*a*, 108*b* in the cable gland body halves 102*a*, 102*b*. To aid in aligning the cable gland body halves 102*a*, 102*b* together, the tongues 110*a*, 110*b* and 116*a*, 116*b* align with the grooves 112*a*, 112*b* and 118*a*, 118*b* located on the opposite cable gland body halves 102*a*, 102*b*.

Once the cable gland body halves 102*a*, 102*b* come together, a threaded coupling 130 is then fastened over the threaded cable gland body halves 102*a*, 102*b*. Its conical shape complementary to the conical shape of the cable gland body allows for a natural lead in which, when progressed along mating threads, will gradually tighten and draw the body halves 102*a*, 102*b* together. Thus, as the coupling 130 is installed, the body halves 102*a*, 102*b* and the gaskets 122*a*, 122*b* are drawn together around the cable 64 creating a water resistant seal and strain relief arrangement.

Once the coupling 130 is installed, the cable gland 100 now contains the pre-terminated cable 60. For entry into a switch cabinet 50, a gasket 140 is positioned over the threaded shafts 114*a*, 114*b* of cable gland body halves 102*a*, 102*b*. The gasket 140 keeps water from entering the knockout 52 in the switch cabinet 50. The lock nut 150 provides a secure means of attaching the cable gland 100 to the cabinet 50.

The split cable gland 100 is designed to be re-used and is ideal for moves, adds, and changes when pre-terminated cabling 60 is utilized. Wrench flats 120a, 120b are incorporated into the design of the cable gland to aid in future removal of the cable gland. Thus, to facilitate assembly and disassembly, flats 120a, 120b on the threaded shafts 114a, 114b allow for use of a wrench to hold the cable gland stationary while use of projected ribs 134 featured on the coupling 130 allows for manual rotation to either tighten or loosen the coupling 130.

Figure 5:
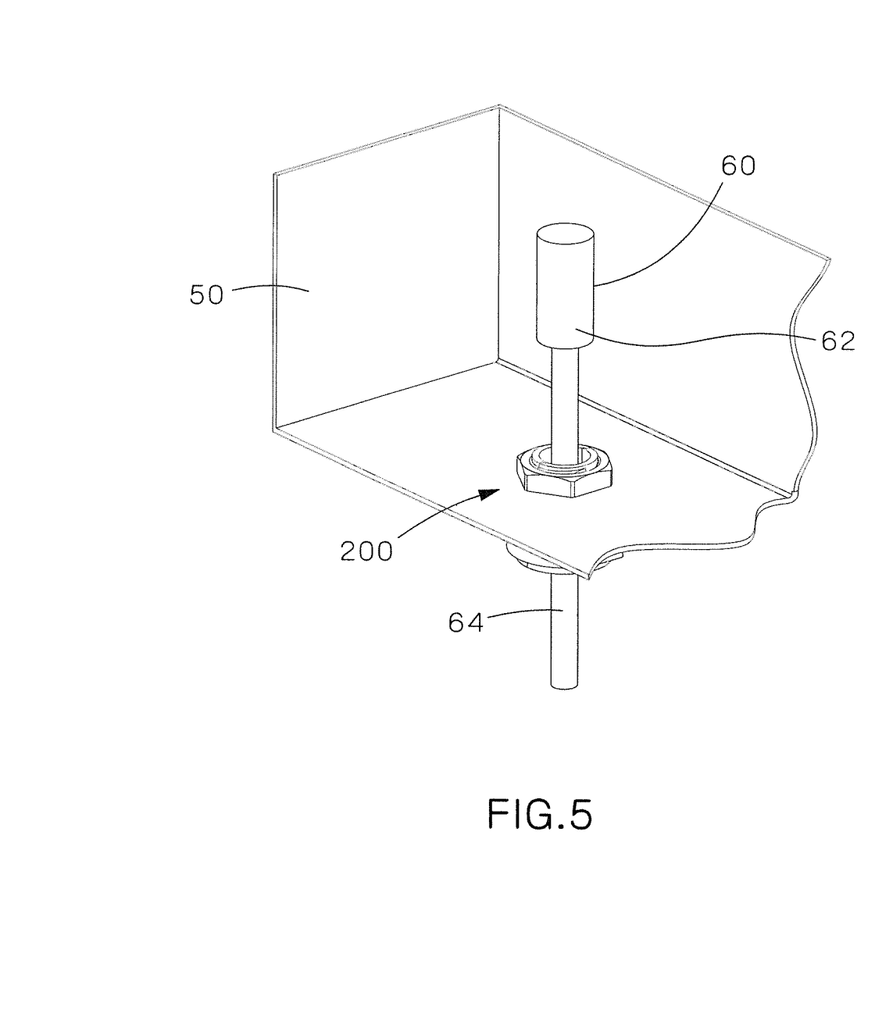
FIG. 5 is a perspective view of an alternative embodiment of the split cable gland of the present invention.
Figure 6:
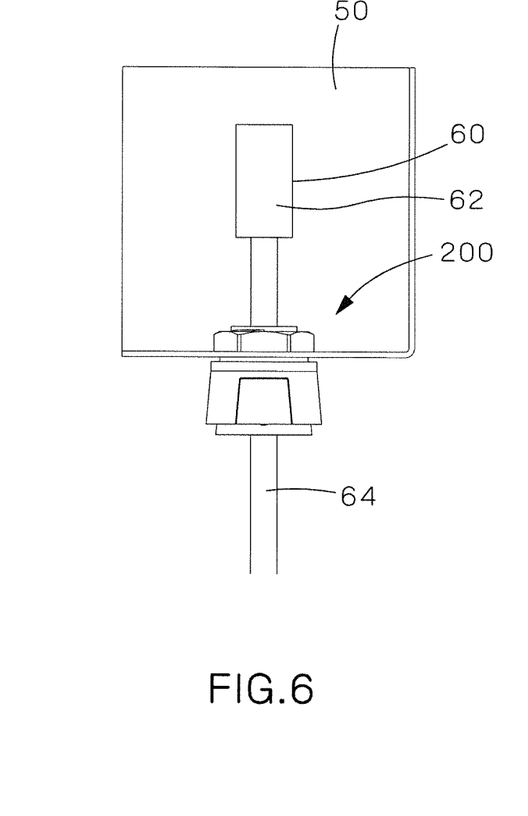
FIG. 6 is a side view of the split cable gland of FIG. 5.

FIGS. 5-10 illustrate a second embodiment of the split cable gland 200 of the present invention. FIGS. 5 and 6 illustrate the fully assembled split cable gland 200 passing through a knockout 52 to the inside of a switch cabinet 50, or other enclosure. The split cable gland 200 houses a pre-terminated cable 60.

The split cable gland 200 includes a polymer base cable gland formed from a first body member 202a and a second body member 202b. The first and second body members 202a, 202b are attached via a tether strap 230. Similar to the cable gland body halves 102a, 102b discussed above with respect to FIGS. 1-4, the first and second body members 202a, 202b include a main section 204a, 204b and a threaded shaft 214a, 214b. Each main section 204a, 204b includes a plurality of slots 206a, 206b and an elongated groove 208a, 208b. Each main section 204a, 204b also includes a tongue 210a, 210b and a groove 212a, 212b at an end of the main section 204a, 204b. Each threaded shaft 214a, 214b includes an elongated tongue 216a, 216b and groove 218a, 218b.

Figure 7:
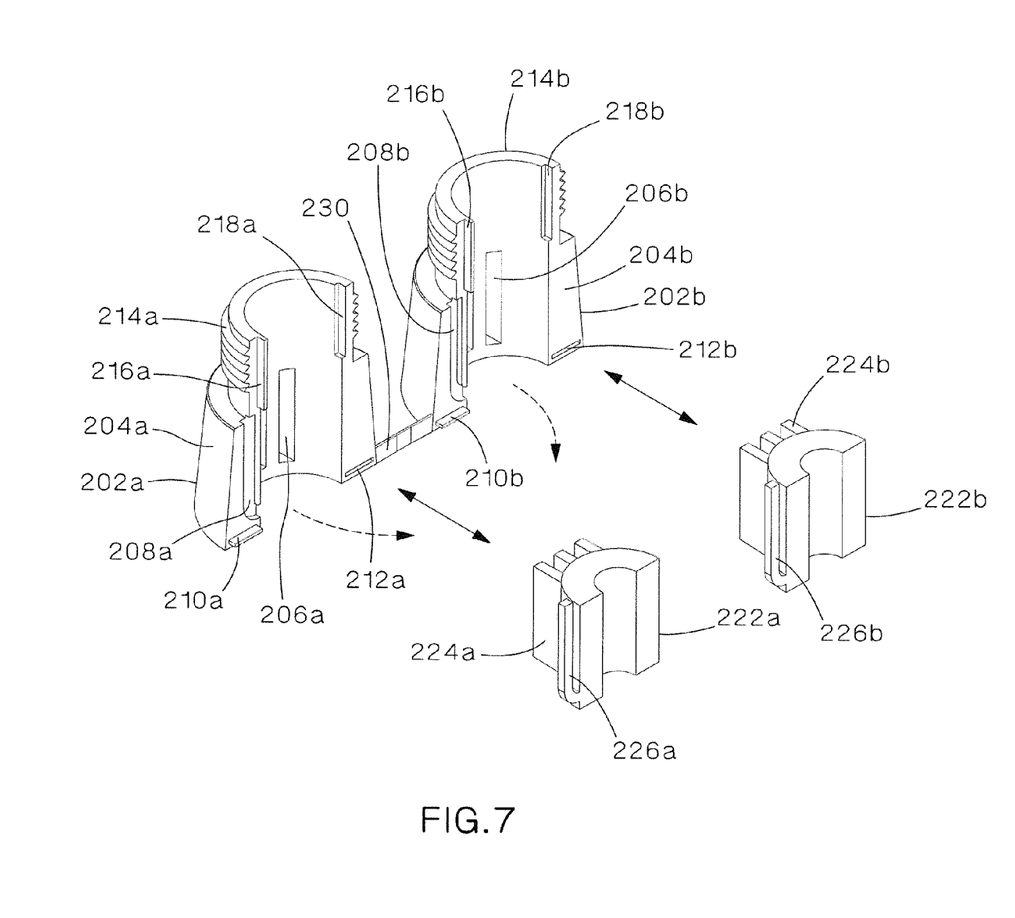
FIG. 7 is an exploded perspective view of the body of the split cable gland of FIG. 5.

As illustrated in FIG. 7, rubber elastomer gaskets 222a, 222b are positioned to be installed in the first and second body members 202a, 202b, respectively. The gaskets 222a, 222b include projected ribs 224a, 224b that are designed to be received within the slots 206a, 206b in the first and second body members 202a, 202b. The gaskets 222a, 222b also include a seal seam 226a, 226b that seats within the elongated groove 208a, 208b located in the first and second body members 202a, 202b.

When the first and second body members 202a, 202b are wrapped around the cable 64, the body members 202a, 202b are aligned by the tongues 210a, 210b and 216a, 216b and grooves 212a, 212b and 218a, 218b located on opposite cable gland body members 202a, 202b. The gaskets 222a, 222b provide a water proof seal along the seam of the joined body members 202a, 202b. The gaskets 222a, 222b also provide a seal around the cable 64 that passes through the cable gland.

Figure 8:
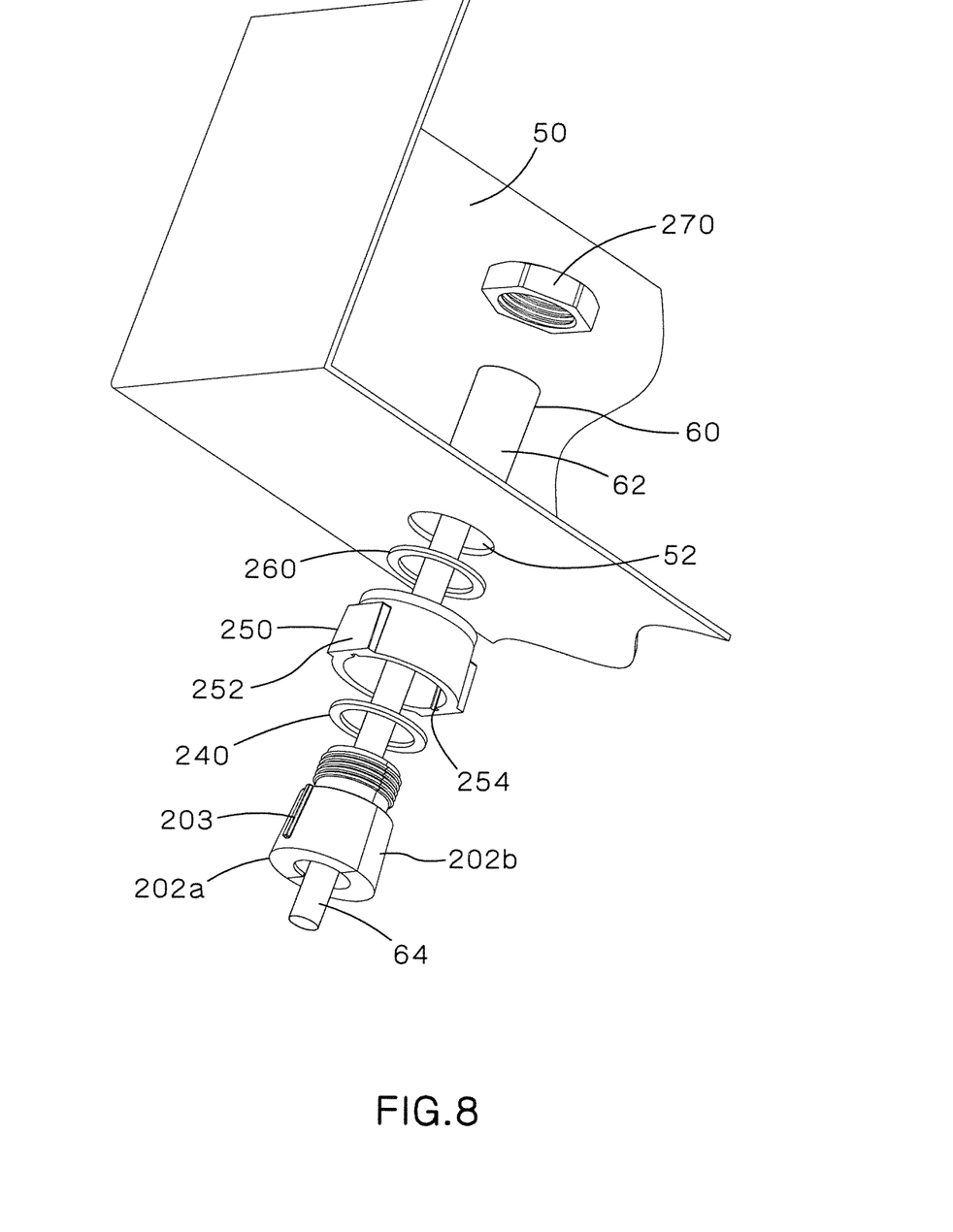
FIG. 8 is a bottom exploded view of the split cable gland of FIG. 5.
Figure 9:
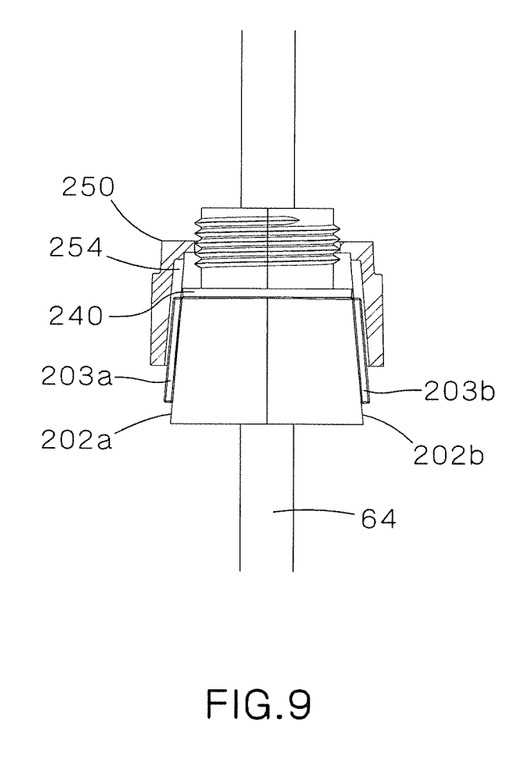
FIG. 9 is a side view of the partially assembled split cable gland of FIG. 5.
Figure 10:
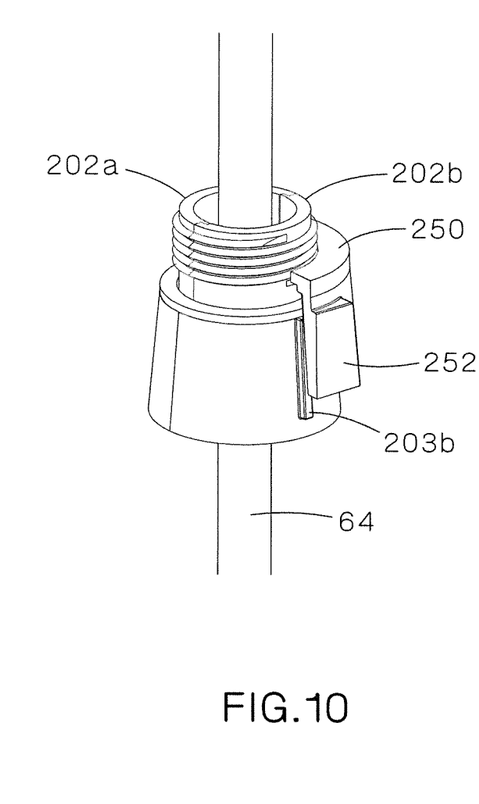
FIG. 10 is a perspective view of the partially assembled split cable gland of FIG. 5.

As illustrated in FIG. 8, the split cable gland 200 also includes a sleeve form 250, sealing gaskets 240, 260 and a lock nut 270. The conical shaped cable gland body members 202a, 202b are wrapped around the cable 64 of terminated connector 62 and are inserted in the conical shaped sleeve form 250. As illustrated in FIGS. 9 and 10, the sleeve form 250 compresses the two mating body members 202a, 202b of the split cable gland 200 along the seams of the body members 202a, 202b. The sleeve from 250 also compresses the gaskets 222a, 222b positioned within the body members 202a, 202b around the cable 64.

As further illustrated in FIGS. 9 and 10, the sleeve form 250 is illustrated sectioned in half. This reveals a tapered lead in which matches that of the assembled cable gland body members 202a, 202b. As the assembled cable gland body members 202a, 202b advances in position relative to the sleeve form 250, the gap between body members 202a, 202b decreases thereby increasing the pressure along the seam.

The sealing gaskets 240, 260 are made of a rubber elastomer material. The sealing gasket 240 is positioned between the cable gland body members 202a, 202b and the sleeve form 250 to provide a water proof seal between these components. The threaded shaft 214a, 214b of the cable gland bodies 202a, 202b will pass through the second sealing gasket 260 and through knockout opening 52 in the switch cabinet 50. The sealing gasket 260 will seal off the knockout opening 52 to provide a water proof seal thereby protecting the switch cabinet 50 against water ingress.

The lock nut 270 will pass through the connector head and mate with threaded shaft 214a, 214b of the cable gland. As the lock nut 270 is tightened, it will further draw the cable gland body members 202a, 202b though the sleeve form 250 thereby increasing the pressure along all seams. This will effectively provide strain relief for the cable 64 positioned therein. The lock nut 270 also provides a secure means of attachment of the assembled split cable gland 200 to the switch cabinet 50.

To keep cable gland body members 202a, 202b from spinning within sleeve form 250 when the locknut 270 is tightened, keys 203a, 203b on the cable gland body members 202a, 202b and grooves 254 on the sleeve form 250 axially lock the cable gland body members 202a, 202b relative to the sleeve form 250. Flats 252 are built onto the sleeve form 250 for allowing channel locks or other tools to grip the sleeve form 250 while the lock nut 270 is tightened.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

The invention claimed is:

1. A split cable gland for sealing and retaining a cable at openings where the cable passes through a cabinet, the split cable gland comprising:
    a first body member and a second body member, wherein the first and second body members each having a main section and a threaded shaft extending from the main section, wherein each main section having vertical slots in an inner surface of the main sections;
    gasket members positioned within the first and second body member, wherein the gasket members having a plurality of outwardly extending ribs, the outwardly extending ribs are positioned within the vertical slots in the main sections of the first and second body members, whereby the first and second body members surround the cable to create a seal and strain relief arrangement around the cable.

2. The split cable gland of claim 1, wherein the split cable gland further comprising a circular gasket positioned over the threaded shafts of the body members for preventing water from entering the cabinet.

3. The split cable gland of claim 1, further comprising a lock nut for securing the split cable gland in the cabinet.

4. The split cable gland of claim 1, wherein the first body member and the second body member are tethered together.

5. The split cable gland of claim 1, wherein the main section of the first body member further comprising a tongue and groove at an end of the main section of the first body member; and the main section of the second body member further comprising a tongue and groove at an end of the main section of the second body member, wherein the tongue and groove of the main sections of the first and second body members align thereby joining the first and second body members to form the split cable gland.

6. The split cable gland of claim 1, wherein the main sections of the first and second body members each having a groove; and wherein the gasket members having a seal seam, whereby the seal seams are positioned in the grooves of the first and second body members to seal the gasket positioned within the first and second body members.

7. The split cable gland of claim 1, wherein the threaded shafts of the first and second body members comprising a tongue and groove positioned along the threaded shaft.

8. The split cable gland of claim 1, wherein the split cable gland further comprising a connection member for securing the first and second body members together, whereby installation of the connection member compresses the gaskets within the first and second body members around the cable.

9. The split cable gland of claim 8, wherein the main section of the first body member and the main section of the second body member have a threaded outer surface.

10. The split cable gland of claim 9, wherein the connection member having threads along the inner surface, the threads of the connection member engage the threads of the main section of the first and second body members when the connection member is installed over the first and second body members.

11. The split cable gland of claim 8, wherein the connection member further comprising projected ribs extending from an outer surface.

12. The split cable gland of claim 8, wherein the main section of the first body member and main section of the second body member having outwardly extending keys.

13. The split cable gland of claim 12, wherein the connection member having grooves formed within an inner surface, wherein the grooves of the connection member receive the keys of the main section of the first and second body members.

14. The split cable gland of claim 12, wherein the connection member further comprising a flat member along an outer surface for gripping the connection member while securing the split cable gland.

15. The split cable gland of claim 1, wherein each threaded shaft further comprising wrench flats for facilitating removal of the split cable gland.

* * * * *